United States Patent [19]
Johansson

[11] Patent Number: 5,174,949
[45] Date of Patent: Dec. 29, 1992

[54] NON CIRCULAR WATER ROD FEATURES

[75] Inventor: Eric B. Johansson, Wrightsville Beach, N.C.

[73] Assignee: General Electric Company, San Jose, Calif.

[21] Appl. No.: 702,793

[22] Filed: May 17, 1991

[51] Int. Cl.$^5$ .............................................. G21C 3/34
[52] U.S. Cl. ................... 376/439; 376/442; 376/443; 376/444
[58] Field of Search ............... 376/447, 444, 448, 442, 376/443, 439; 976/DIG. 60, DIG. 64

[56] References Cited

U.S. PATENT DOCUMENTS

| | | | |
|---|---|---|---|
| 4,420,458 | 12/1983 | Dunlap et al. | 376/447 |
| 4,597,937 | 7/1986 | Sakurai et al. | 376/441 |
| 4,876,063 | 10/1989 | Johansson | 376/444 |
| 5,002,726 | 3/1991 | Johansson | 376/448 |

Primary Examiner—Donald P. Walsh
Assistant Examiner—Meena Chelliah
Attorney, Agent, or Firm—Robert R. Schroeder

[57] ABSTRACT

A fuel bundle and fuel bundle assembly sequence utilizing a peanut sectioned large water rod is shown locking spacers into place along the axial length of the water rod. In a first embodiment, clearance is defined relative to tabs welded on the large water rod so that spacer assembly to the water rods can occur. In a second and preferred embodiment, spacers are individually equipped with springs locking into complimentary apertures in the peanut sectioned water rod. In both embodiments, the spacers are threaded onto the peanut sectioned water rod and locked into alignment for the receipt of the fuel rods. An improved suspension of the water rod relative to the lower tie plate is disclosed in which a transition piece connects the large water rod to a flexible rod which is threaded at its lower end. This rod is screwed into a threaded aperture in the lower tie plate. Connection of the water rod to the upper tie plate does not occur with the result that assembly is simplified and total fuel bundle part count reduced.

10 Claims, 10 Drawing Sheets

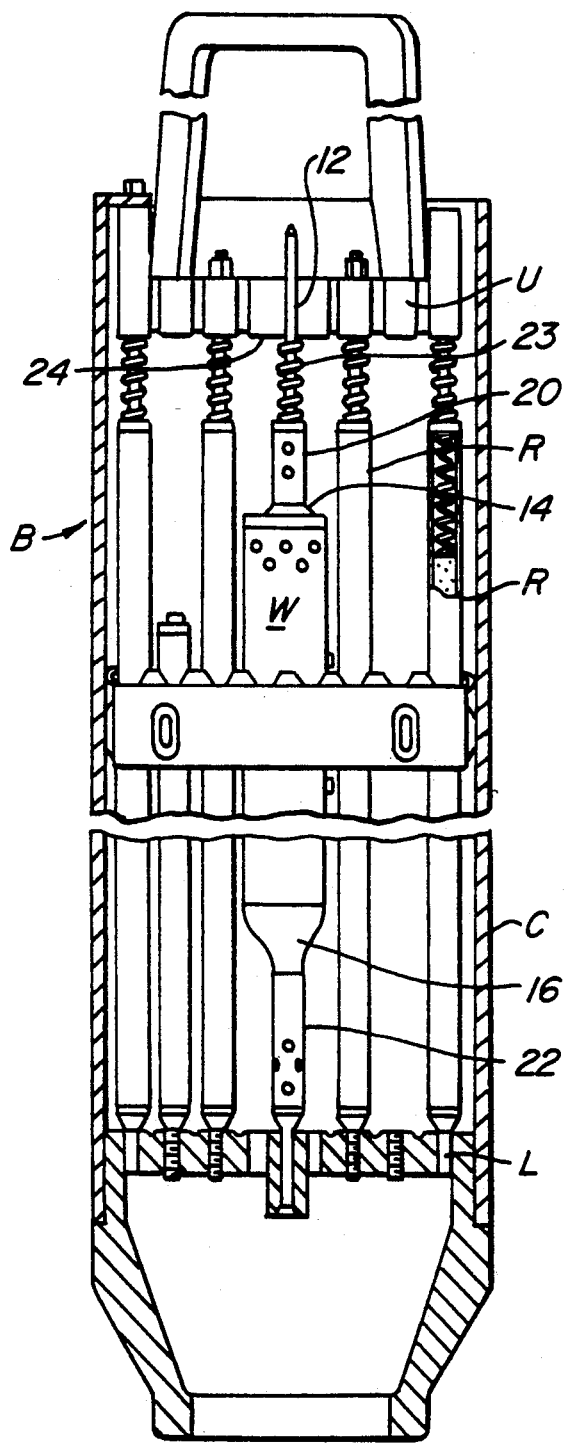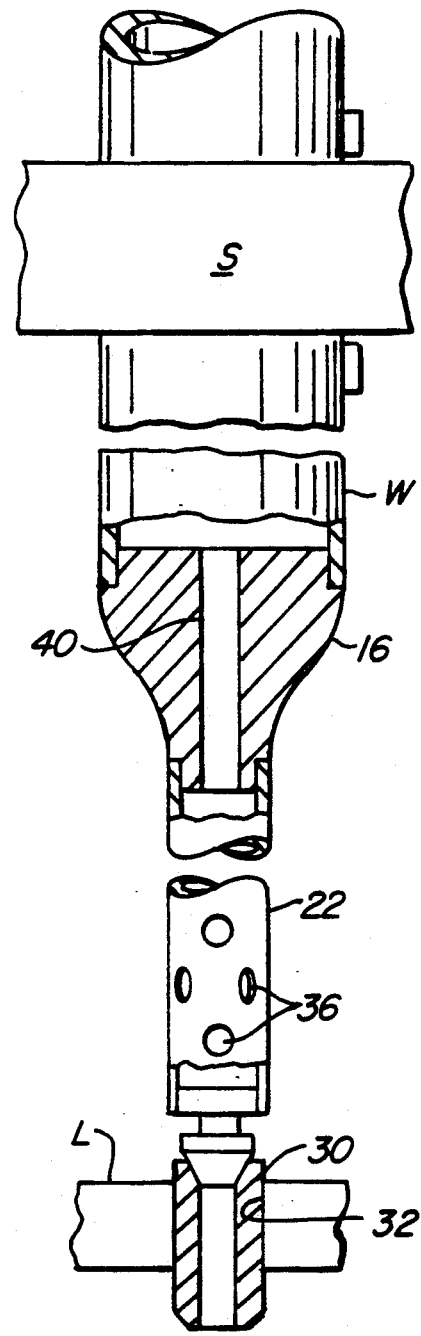
FIG. 1A.
(PRIOR ART)
FIG. 1B.
(PRIOR ART)

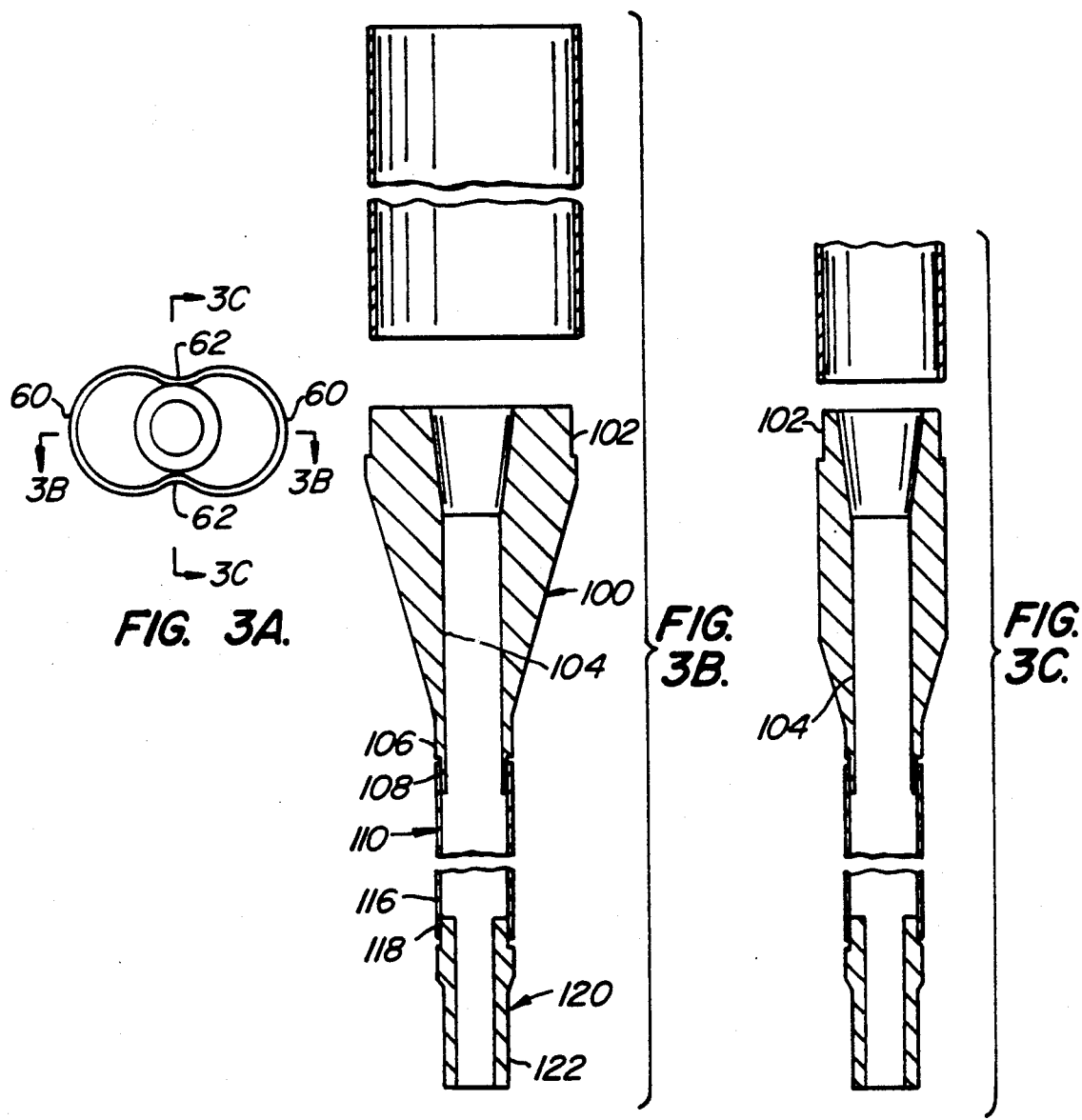

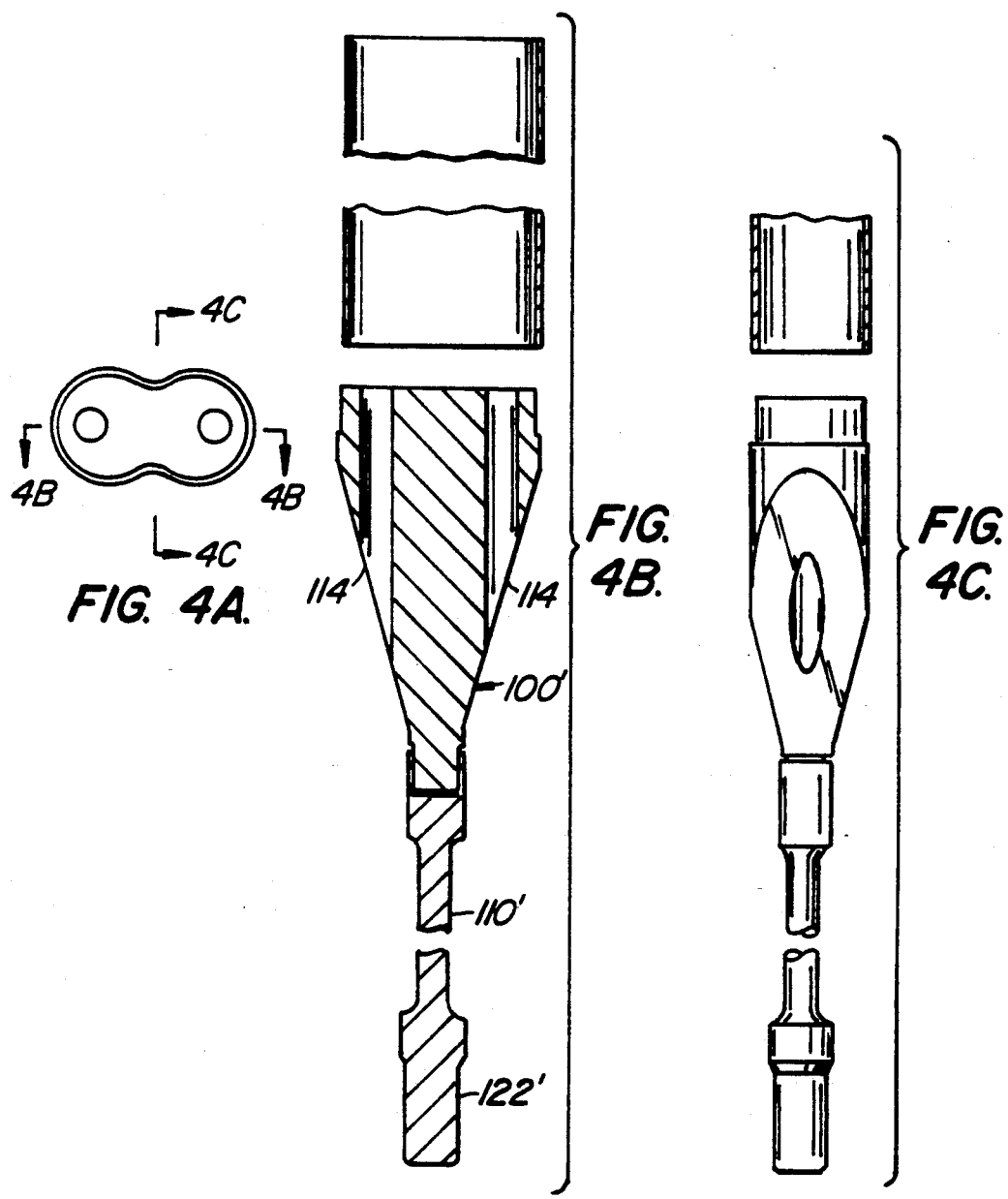

NON CIRCULAR WATER ROD FEATURES

This invention relates to a nuclear fuel bundle having a large water rod, replacing two or more fuel rods, which has a non-circular cross section. Specifically, a fuel bundle construction is shown in which this section is incorporated to a fuel bundle with its associated spacers and tie plates. The present invention discloses means for locating spacers on the non-circular water rod, and discloses simplifications in water rod design. These means and simplifications are applicable to a broad class of water rod cross sectional shapes.

BACKGROUND OF THE INVENTION

Water rods having a non-circular cross section have been proposed for BWR fuel bundles. Many cross sectional shapes could be used. Three shapes are described with emphasis on a "peanut" shape.

The use of a non-circular cross section creates problems in locating spacers on the water rod, and also creates opportunities for simplifying the water rod construction.

The "peanut" shape is used as an illustrative example.

The origin of this "peanut" cross section can be best understood when the displacement of fuel rod positions by large water rods is understood with respect to a matrix of upstanding fuel rods within a fuel bundle for a boiling water nuclear reactor.

Nuclear fuel bundles utilized in boiling water nuclear reactors can be simply summarized. Specifically, such bundles include a matrix of upstanding fuel rods. These fuel rods are supported on a lower tie plate, extend to and toward an upper tie plate, and generally define a matrix of rows and columns of vertical fuel rods. The lower tie plate—in addition to the supporting of the fuel rods—permits the entry of water. The upper tie plate—in addition to maintaining the matrix of fuel rods upright from the lower tie plate—permits the discharge of heated water and generated steam from the interior of the fuel bundle. A channel surrounds the fuel bundle from the lower tie plate to the upper tie plate. This channel confines fluid flow from the lower tie plate to the upper tie plate while maintaining the flow path in the interior of the fuel bundle separate and apart from the so-called core by pass region exterior of the fuel bundle.

It is important to the fuel bundle that the matrix of upstanding, long slender fuel rods be reinforced interior of the fuel bundle. This reinforcement enables the fuel rods to maintain their designed side-by-side relation for efficient nuclear reaction as well as avoid vibrating contact one with another. Specifically, the fuel rods must be held in place at intervals along the length of the fuel bundle. This is accomplished by so-called spacers placed at intervals along the length of the fuel bundles. These spacers form a cell matrix around each individual fuel rod and thus maintain the fuel rods in their designed side-by-side relationship against the forces of flow induced vibration and rod bow.

Operation of the fuel bundle is simple to understand. Water enters the fuel bundle through the lower tie plate. The water acts both as a coolant and a moderator. Acting as a coolant, the water is heated and turned to steam in the fuel bundle by heat generated in the fuel bundle. Acting as a moderator, fast neutrons from the nuclear reaction are moderated and become slow moving or thermal neutrons to continue the chain reaction in the interior of the fuel bundle. As a result, steam generating reaction continues in a core of many fuel bundles in the boiling water nuclear reactor.

When operating, such fuel bundles have increasing fractions of steam in the upper two phase portion of the fuel bundle. These increasing fractions of steam take away needed moderator in the upper two phase region of the fuel bundle. At the same time, moderator is needed in the upper two phase region of the fuel bundle. To remedy this lack of moderator in the upper two phase region of the fuel bundle, large water rods have been used. The function of these large water rods can be summarized.

Simply stated, the term "large water rod" is a term of comparison. By comparison to the fuel rods, the large water rods have an increased diameter. The water rods receive water from the lower single phase (water) region of the fuel bundle (either through the tie plate or from the water immediately above the tie plate) and transport that water without boiling to the upper two phase region of the fuel bundle. When the water resident in the large water rod reaches the upper two phase region of the fuel bundle, it increases the so-called "fuel to moderator" ratio in the upper two phase region of the fuel bundle. As a result, greater moderation of the fast neutrons to their thermal state occurs, and a more efficient fuel bundle is obtained.

In order to maximize the moderating effect of the large water rod, and to minimize bypass flow area, the water rod should fill as much of the available space as possible. When two or more fuel rods are removed from a square array, the resulting area can only be partially filled by a circle. For example, in prior art 8×8 fuel lattice, 4 central fuel rods were removed and were replaced by a circular water rod. In this case the circle fills most of the square area resulting from the removal of four fuel rods.

In a prior art 9×9 fuel bundle, it was found that an optimum nuclear design resulted when seven fuel rods were removed. In this case two large water rods were used, and the fraction of the area occupied by the two water rods was smaller. A substantial gain in neutron moderation and reduction in bypass flow area can be obtained by using a single water rod of non-circular cross section. However, a noncircular water rod cross section creates problems in the assembly of a fuel bundle and the location and locking of the spacers to the fuel bundle.

One of the functions of a water rod is to hold the spacers in their correct axial position. Unfortunately, the spacer locating method used with circular water rods cannot be used with a non-circular cross section. The invention described herein provides alternate methods for locating the spacers with a non-circular water rod cross section.

Fuel bundles having large water rods are typically given an assembly sequence which features the use of the water rods in aligning the fuel bundle spacers to receive the individual fuel rods within the fuel rod matrix. Specifically, the spacers are typically held in their assembled spaced apart alignment in a jig. Once the spacers are in place, the large water rod is assembled to the spacers and locked with respect to the spacers. Such locking typically occurs by rotating the water rod relative to the spacers in a jig until a system of tabs or springs locks the water rod and spacers into a "tree" type configuration. In this tree type configuration, all of the cells for holding the individual fuel rods are aligned.

Typically, the lower tie plate is inserted at one end of the water rod and spacer assembly which is to become the fuel bundle.

Thereafter, the fuel rods are inserted to the jig held spacers. Each fuel rod is successively threaded through the aligned cells of the spacers to a position of penetrating support on the lower tie plate. Such insertion continues until all fuel rod positions are occupied. Thereafter—and as one of the final steps of assembly - the fuel rod channel is placed about the fuel bundle.

It is important to note, that in the prior art in order to effect the locking of the spacers to the large water rod, rotation of the large water rod had to occur relative to the spacers.

Variations have been used in the cross sectional configuration of water rods. All these variations take advantage of some portions of the water rod section being round. These variations have included the use of two round water rods. As most pertinent to this disclosure, such variations include having so-called double "D" shaped water rods.

In the so-called double "D" water rod, a configuration not unlike a peanut sectioned water rod is eventually generated. Typically, two water rods each having a "D" cross section are placed back to back.

"D" sectioned water rods have a basic circular configuration. These "D" sectioned water rods a truncated by a chord in their cross section. Typically the chord cuts off something less than one half of the total diameter of the water rod. A fat "D" section to each one half of the pair of water rods results.

Placement of two such "D" sectioned water rod occurs within the fuel bundle. The linear portion of the "D" section on one water rod is placed back to back with the linear portion of the "D" section on the other water rod. Since the linear portion of the "D" section occurs along a chord leaving more than one half the circular section of the water rod intact, the two water rods when placed back to back have a total cross section not unlike a "peanut" sectioned water rod.

Remembering that the "D" sectioned water rod is basically circular, it is still possible to use rotation of one "D" sectioned water rod is utilized to lock the fuel rod spacers in place. Specifically, excepting for the linear portion of the "D", such fuel rods are generally round. Typically a first "D" sectioned water rod is placed. Thereafter, this first "D" sectioned water rod is rotated to lock the spacers through which the water rod is threaded into place. This locking of the spacers disposes the "D" sectioned water rod in its final rotational alignment. The remaining "D" sectioned water rod is then moved into place. This second water rod has its linear section at the "D" cross section confronted to the linear section at the "D" of the first placed water rod. As a result, both water rods are locked in rotational alignment with the spacers keyed to the first placed "D" sectioned water rod.

The double "D" water rod contains the double metallic boundary between the two linear sections of the "D". This being the case, unnecessary absorption of neutrons occurs. Because of this unnecessary neutron absorption, the so-called "peanut" sectioned water rod is preferred because of its lesser neutron absorption.

Unfortunately, the "peanut" sectioned water rod does not lend itself to easy rotation. Locking of the spacers to the section of the water rod is complicated. It is believed that this is a principal reason that such water rods have not been utilized heretofore in fuel bundle designs.

It is further to be noted that large water rods have to be connected to the fuel bundles—typically at the upper and lower tie plates. Such attachment has in the past included a small sectioned conduit from the lower tie plate to the larger sectioned water rod. This small sectioned conduit it provided to enable necessary movement of the large water rod with respect to the fuel bundle. For example, seismic design requires that such a flexible connection be utilized.

Typically, the large cross section water rod begins at a location considerably above the tie plate. Further, it has been the practice in the past to spring load the large water rod downward toward and onto the lower tie plate to secure the large water rod in the fuel bundle assembly. While such spring loading serves to secure the large water rod, it has the disadvantage of requiring an assembly procedure in which many parts are utilized. Further, these additional parts contribute to the neutron absorption of the fuel rod.

SUMMARY OF THE INVENTION

A fuel bundle and fuel bundle assembly sequence utilizing a peanut sectioned large water rod is shown locking spacers into place along the axial length of the water rod. In a first embodiment, a small rotation of the peanut water rod is used together with locking tabs on the water rod to assemble the spacers and lock them in place. In a second and preferred embodiment, spacers are individually equipped with springs locking into complimentary apertures in the peanut sectioned water rod. In both embodiments, the spacers are assembled onto the peanut sectioned water rod and locked into alignment for the receipt of the fuel rods. An improved attachment of the water rod to the lower tie plate is disclosed. A transition piece connects the non-circular water rod to a small diameter rod or tube, which has threads at its lower end. The water rod assembly is screwed into the lower tie plate. Connection of the water rod to the upper tie plate does not occur with the result that assembly is simplified and total fuel bundle part count reduced. Introduction of coolant to the water rod occurs through either the threaded rod at the lower tie plate in the preferred embodiment or alternately from channels at the lower end of the large water rod communicating with the single phase region of the fuel bundle. There results a fuel bundle construction featuring the peanut sectioned water rod which provides relatively large amounts of water moderator for the displaced fuel rod positions within the fuel rod matrix.

BRIEF DESCRIPTION OF THE DRAWINGS

FIG. 1A is a prior art side elevation section of a fuel bundle taken from FIG. 7 of Nelson et al. U.S. Pat. No. 4,675,154 entitled Nuclear Fuel Assembly with Large Coolant Conducting Tube issued Jun. 23, 1987 illustrating the fuel bundle having a large water rod with connection to a lower tie plate and spring loading of the large water rod from the upper tie plate onto the lower tie plate;

FIG. 1B is a prior art side elevation section taken from FIG. 6 of the Nelson et al. '154 Patent illustrating the lower fitting for the supplying of coolant to the large water rod;

FIG. 3A is a cross section of the peanut sectioned large water rod illustrating the relative size of the tie plate connecting rod relative to the peanut sectioned water rod;

FIG. 3B is a side elevation section taken along lines 3B—3B of FIG. 2A with the section here showing connection of the large water rod by threaded connection of a threaded tube through the lower tie plate;

FIG. 3C is a side elevation section taken along lines 3C—3C of FIG. 2A, the section being similar to the section of FIG. 3B;

FIG. 4A is a cross section of the peanut sectioned large water rod illustrating an alternate method for connecting the large water rod to the lower tie plate and showing communication of coolant to the water rod from the lower single phase region of the fuel bundle;

FIG. 4B is a side elevation section taken along lines 4B—4B of FIG. 4A with the section here showing connection of the large water rod by threaded connection of a threaded rod through the lower tie plate with the communication of water coming from the single phase region in the lower portion of the illustrated fuel bundle;

FIG. 4C is a side elevation section taken along lines 4C—4C of FIG. 4A, the section being similar to the section of FIG. 4B;

DESCRIPTION OF THE PREFERRED EMBODIMENT

Nelson et al. U.S. Pat. No. 4,675,154 entitled Nuclear Fuel Assembly with Large Coolant Conducting Tube issued Jun. 23, 1987 is incorporated to this disclosure by reference. This Nelson et al. U.S. Pat. No. '154 is useful in understanding the relevant prior art and enables the present disclosure to be more fully understood.

Figure 1C:
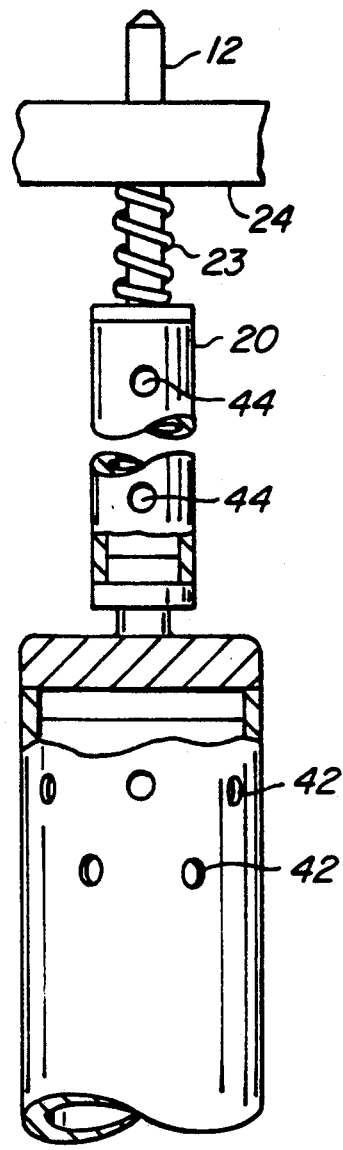
FIG. 1C is a prior art side elevation section taken from FIG. 8A of the Nelson et al. '154 Patent illustrating the top fitting for loading the large water rod from the upper tie plate onto the lower tie plate to secure the water rod against movement.

FIG. 1A-1C shows a fuel bundle B including an upper tie plate U, a lower tie plate L with a matrix of vertically upstanding fuel rods R extending between the two tie plates. The tie plates have the function of supporting the fuel rods R as well as permitting the inflow of water at the lower tie plate L and the out flow of water and generated steam at the upper tie plate U. A channel C extends around the fuel rods R and confines the fluid flow within the fuel bundle B to a path between the respective tie plates L and U.

To improve the moderator to fuel ratio, a typical prior art large circular water rod W is utilized. Typically such a large water rod occupies four lattice positions in the fuel rod bundle, displacing four fuel rods. Transition pieces 14, 16 at the top and bottom of the rod connect the large diameter central part of the water rod to smaller diameter tubes 20, 22. At the top the small diameter tube ends in a circular end plug 12 which fits into the upper tie plate. A spring 23 fits over the end plug and bears against the lower surface 24 of the upper tie plate U. The spring forces the entire water rod W down against the lower tie plate L.

Referring to FIG. 1B, the smaller diameter tube 22 at the bottom ends at a square end plug 30, which fits into a square hole 32 in the lower tie plate L. The square end plug 30 and square hole 32 prevent rotation of the water rod W. Rotation must be prevented to insure capture of spacers such as spacer S to the water rod W.

The lower small diameter tube 22 extends for about 12"-16" from just above the lower tie plate L to just below the lowest spacer. The function of this long, small diameter tube is to provide flexibility to accommodate seismic movement of the lower tie plate relative to the large water rod in the fuel bundle and water rod W, as described in Nelson et al. U.S. Pat. No. 4,675,154.

The lower tube has large diameter holes 36 in its lower portion. These holes act as inlets for water from the single phase region at the bottom of the fuel bundle B. These inlet holes must be near the bottom of fuel bundle B to insure that only water and no steam enters water rod W.

In addition to holes 36, the lower transition piece 16 has a central hole 40 through which water enters the main large diameter part of water rod W. This hole 40 acts as an orifice and is sized to provide the correct water flow through the water rod W. Water exits the large diameter portion of the water rod through holes 42 at the upper end of the large diameter. In addition, the spring loaded rod 20 at the upper portion of water rod W is provided with holes 44 to provide required local circulation.

Circular water rods have been used to capture the spacers S; that is, to prevent axial movement of the spacers S with respect to water rod W and to assist in the fuel bundle assembly process. Tabs (not shown) are welded on the water rod W at axial locations just above and below the location of each spacer S. The water rod W is inserted through the spacers S with an angular orientation such that the tabs pass through the spacers S. The water rod W is then rotated so that the tabs prevent axial movement of the spacers. In the construction illustrated in the Nelson et al. '154 patent, the square lower end plug 32 is inserted into the square lower tie plate hole 34. The water rod W remains fixed in that angular orientation required for locking all of the spacers S in their correction position of elevation.

As has been set forth previously, in some fuel bundle designs optimum nuclear efficiency is obtained by using a noncircular water rod. Remembering that the water rods displace fuel rods from matrix positions, conforming the boundaries of the water rods to fit about the matrix positions without taking away the matrix positions yields efficiencies.

Figure 2A:
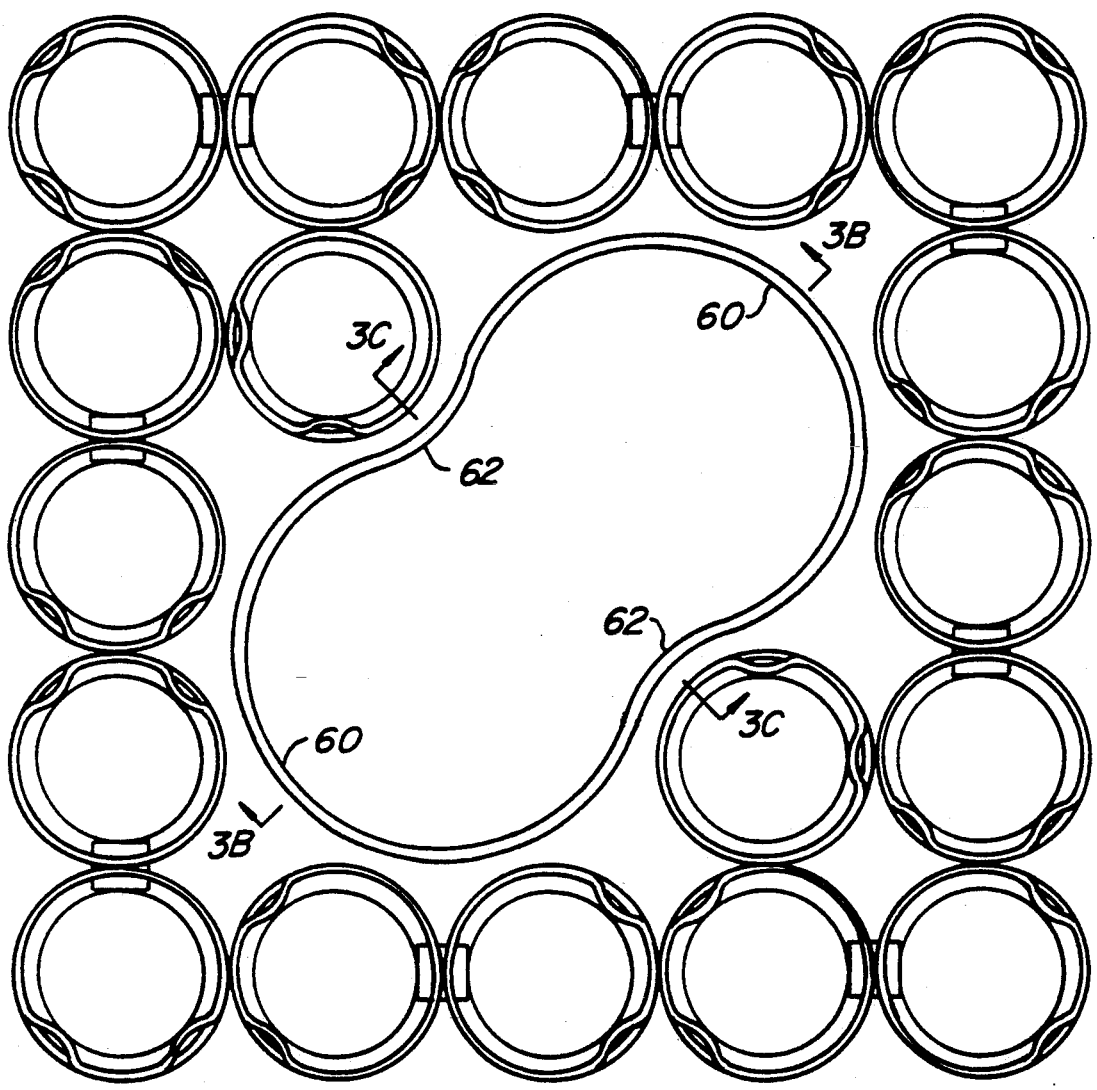
FIG. 2A is a plan section taken at the water rod of this invention illustrating only a portion of the 9 by 9 matrix utilized with this invention and specifically illustrating how the so-called "peanut" section of the water rod effects the introduction of a maximum volume of water moderator within the area provided by the removal of seven fuel rods.
Figure 2B:
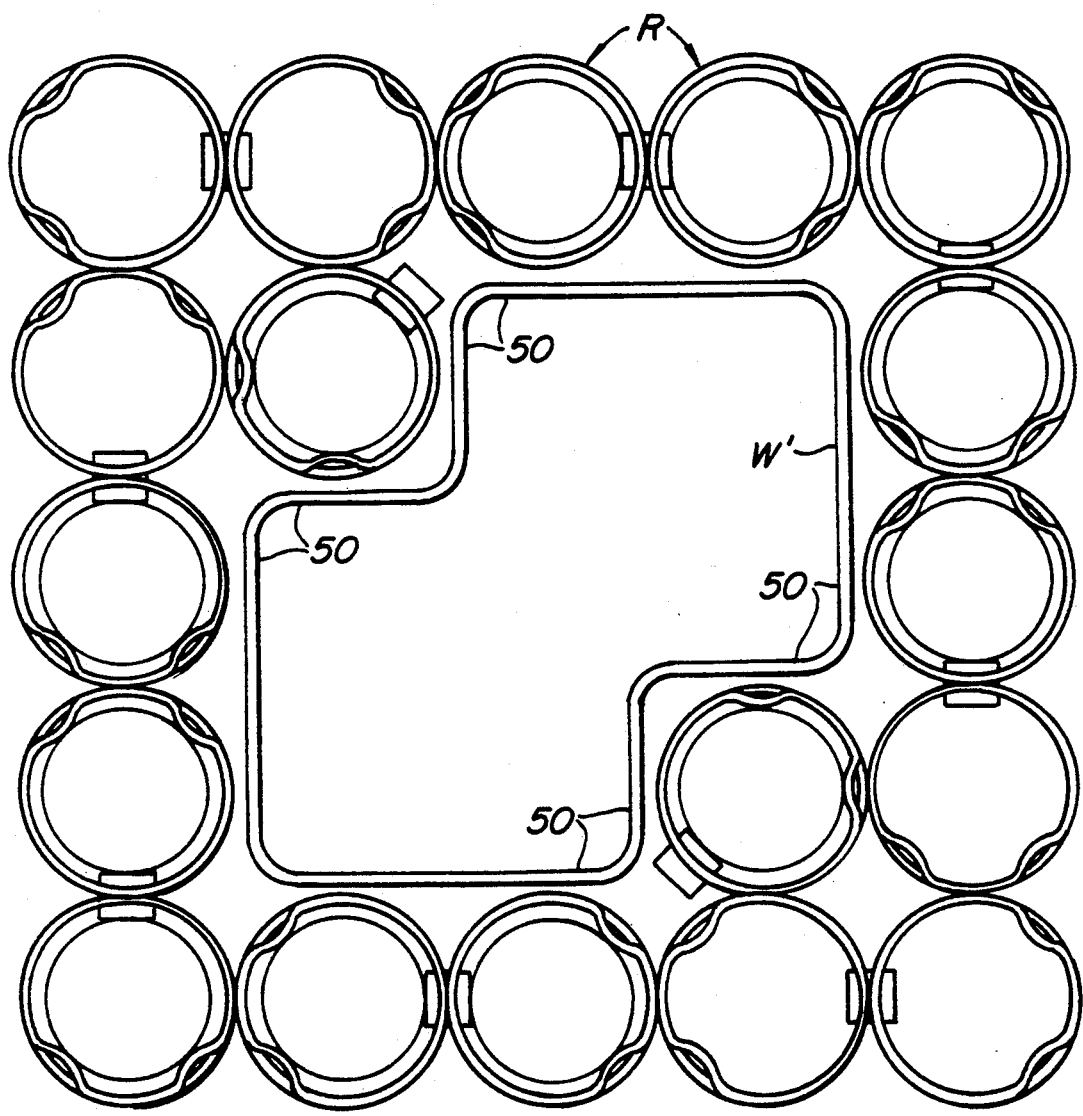
FIG. 2B is a plan section taken at the water rod, with the water rod here illustrated having linear sides, displacing seven fuel rods in the portion of the fuel rod matrix shown.
Figure 2C:
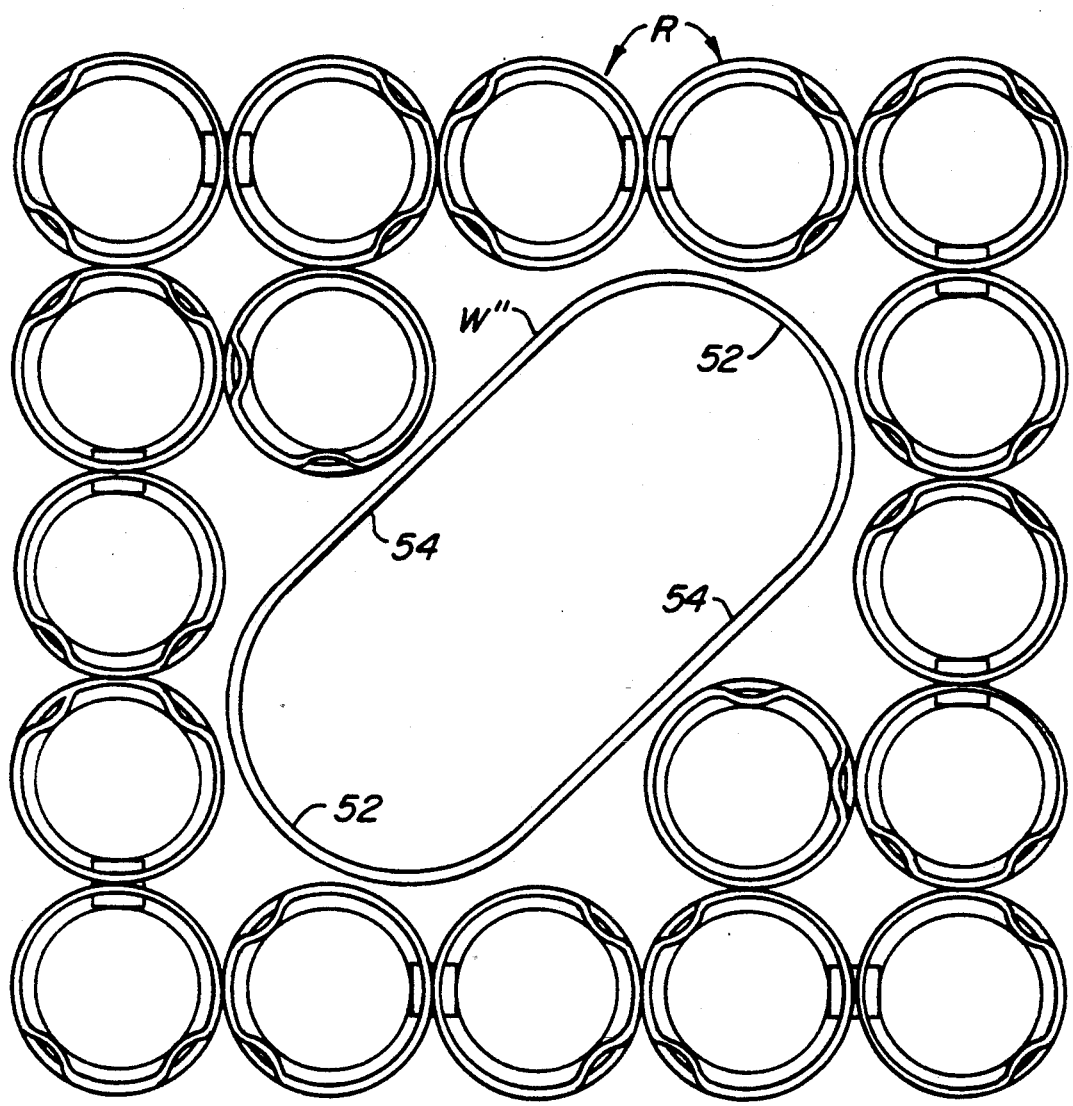
FIG. 2C is a plan section of a water rod having planar sides and semi-circular ends, again displacing seven fuel rods within the portion of the 9 by 9 fuel rod matrix shown.

FIG. 2A shows a cross section of a "peanut" water rod occupying 7 lattice positions, while FIGS. 2B and 2C show alternate large water rod shapes.

Referring to FIG. 2B, a water rod section W' is illustrated wherein 7 fuel rods have been displaced by the single water rod having eight straight side sections 50. Each side section defines a linear boundary between the water rod and adjacent fuel rods. While this water rod W' is theoretically ideal in its water containment versus fuel rod R displacement characteristics, it is difficult to manufacture.

Referring to FIG. 2C, a water rod section W" is illustrated. This water rod section W" has two round portions 52 connected by linear side walls 54. This type of water rod construction has the advantage of being relatively easy to manufacture. This water rod section, however, does not replace the seven displaced fuel positions with water volume as efficiently as might otherwise be desired. Consequently, this design is not as favored as that design set forth in FIG. 2A.

Of the various cross sectional shapes that can be utilized, the so-called "peanut" sectioned water rod P, as shown on FIG. 2A is preferred. This design includes opposite rounded portions 60 which come close to fully occupying each of the three fuel rod lattice position occupying either end of the water rod P. At the same time, the narrowing of the water rod section at inwardly disposed rounded sections 62 enables spanning of the central displaced fuel rod position. The peanut sectioned water rod P also has sufficient clearance from fuel rods R to enable a relatively smooth transition between the opposite ends of the water rod P without interfering with the necessary coolant flow to the surrounding fuel rods R.

Once the irregular shapes and their advantages in placing additional moderator in place are understood, the assembly difficulties encountered over conventional prior techniques can be understood. It is at once seen that the noncircular shapes of the water rods of FIGS. 2A, 2B and 2C permit little significant rotation of the water rod relative to each spacer. Since both the spacer and the water rod at the spacer are other than round, relative movement between the water rod and the spacer is restricted.

Therefore, the prior art spacer capture method cannot be used. Since rotation is prevented by the spacers, the lower square end plug and the square hole in the lower tie plate is likewise not needed.

The reader will understand that the following construction details can be applied to the water rod cross sections illustrated in FIGS. 2A, 2B or 2C.

Referring to FIGS. 3A, 3B and 3C, a construction of the water rod utilized with this invention can be understood. Referring to FIG. 3A, the cross section of the "peanut" sectioned water rod is illustrated. Water rod W is illustrated with two positively curved end walls 60 and two negatively curved central curvatures 62. Over all, these respective curvatures impart to the water rod a figure "8" configuration.

As set forth in the embodiment of FIGS. 3A–3C, a transition piece 100 is required. The transition piece has an upper figure "8" sectioned end appropriately recessed to fit into the interior of the water rod W. It includes a central bore 104 for channeling water from lower tie plate L upwardly through the piece and into the water rod W. As in the prior art, bore 104 is sized to meter single phase water coolant to water rod W at a rate where moderator will remain in the liquid state interior of water rod W.

The bottom portion 106 of the transition piece 100 fits into tube 110 at recessed portion 108. Similarly, the upper portion of the lower end plug 122 fits into tube 110 at a recessed portion 118. The lower end plug 122 is threaded at the exterior surface and is screwed into the lower tie plate. Circumferential welds are made at the junction between the water rod W and the transition piece 100, between the transition piece and the tube 110, and between tube and the lower end plug 120. The tube 110 extends from just above the lower tie plate to just below the lowest spacer, providing a flexible connection between the large water rod and the lower tie plate.

As will hereinafter be more fully understood, the water rod W is secured against rotation relative to the spacers. Once the fuel rods are inserted and the channel C placed over the fuel bundle, rotation of the water rod relative to the fuel bundle is severely restricted.

FEATURES OF DISCLOSED NON-CIRCULAR WATER ROD

With this construction, it will at once be observed that vertical motion of the water rod cannot occur. Given that the spacers S along the length of the water rod W supply adequate transverse support, support of the upper end of the water rod W is not required. Therefore, the upper end plug and hold down spring used in the prior art are not needed.

The water rod W is terminated at the upper end of the main large cross section portion of the fuel bundle B. Water rod flow exits vertically from the top of the water rod W. Over the prior art, the upper transition piece, upper small diameter tube, upper end plug and spring are eliminated. While this may appear to be a minor simplification, it is to be remembered that the assembly of such parts in a production sequence can often be a source of error. Thus, simplifications of the type disclosed are advantageous.

Two embodiments of invention are disclosed for the lower small diameter portion of the water rod and the transition piece.

The first embodiment is shown in FIGS. 3A, 3B, and 3C. The lower end plug is hollow and extends through the lower tie plate L. The small diameter lower portion of the water rod is tubular, and the transition piece has a central hole 104. Water enters the water rod from the lower tie plate L, flows through the hollow end plug or fitting 122, the small diameter tube 110 and the hole 104 in the transition piece. The dimensions of this flow path are set to give the correct flow resistance, so that the correct water rod flow to maintain moderator in the liquid state interior of the water rod P is obtained. As in the prior art, the small diameter tube extends from just above the lower tie plate to a short distance below the first spacer. This tube is flexible so that relative movement of the water rod P relative to the lower tie plate L can be accommodated.

A second embodiment is shown in FIGS. 4A, 4B and 4C. The lower end plug is solid and is integral with a solid rod 110'. Solid rod 110' has a lower portion 122' which is threaded on the outside and secures itself to the lower tie plate L. The solid rod 110' is welded to the transition piece. This rod can have a reduced diameter between fitting 100' and the threaded portion. A short length is sufficient to provide the required flexibility for permitting relative movement between the water rod and the lower tie plate L.

Flow enters the water rod through parallel vertical holes 114 in either side of transition piece 100', as shown on FIG. 4B. From the stand point of construction alone, the configuration of the water rod fittings shown in FIGS. 4A, 4B and 4C is simple. However, with respect to the thermal hydraulic considerations which occur interior of the fuel bundle B, the construction illustrated in FIGS. 3A, 3B and 3C is preferred.

Having set for the construction of the water rod P and it attachment to the lower tie plate L, attention can now be directed to the spacers. In the following discussion, it will be remembered that the sequence of fuel bundle assembly is important. Specifically, the spacers S must first be assembled to the water rod W. As assembled to the water rod W, the individual cells of the spacers are each individually aligned in a "tree" like configuration to the water rod W. Thereafter, the individual fuel rods are threaded through the aligned spacers cells captured by the "tree" like configuration about the water rod P. Finally, the channel C is installed about the fuel bundle and the assembly is essentially complete.

Spacer Capture Method

The spacers utilized with the preferred embodiment of this invention are conventional ferrule type spacers. These spacers S are fabricated from Zircaloy sheet and tubing and include individual ferrules. The gross construction of these spacers is well understood in the prior art.

Figure 5:
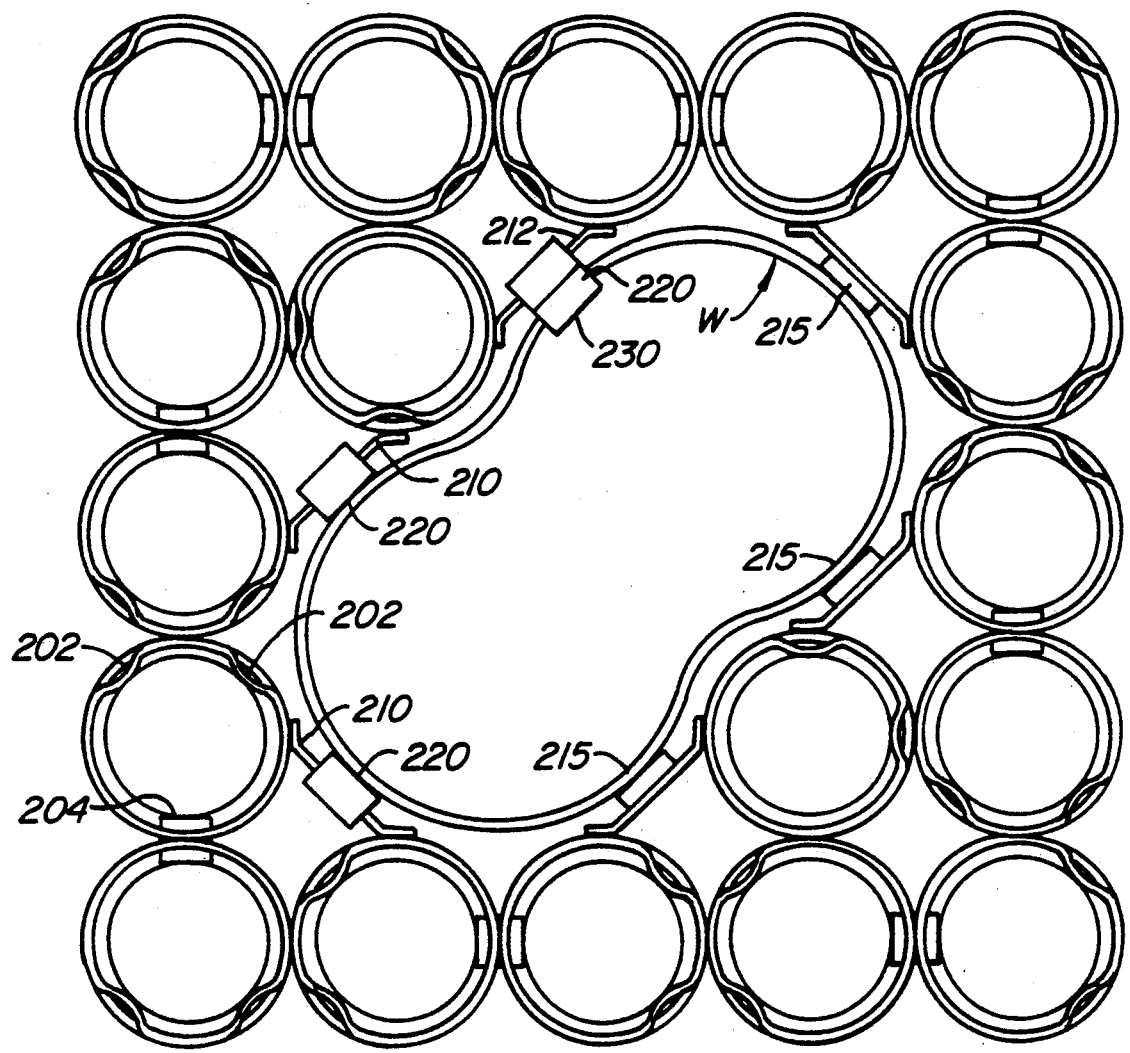
FIG. 5 is an illustration of the peanut sectioned water rod at a typical spacer illustrating the water rod with a locking aperture therein and having a spring for locking the illustrated spacer to the water rod at a selected elevation.

Referring to FIG. 5, only that portion of a conventional spacer S immediately about the water rod W are illustrated. Each spacer includes individual ferrules F. Ferrule F includes formed stops 202 in the upper and lower portions of the ferrule. A spring 204 is commonly shared between two adjacent ferrules. Spring 204 serves to bias the fuel rods R within the spacers against stops 202 against the forces of flow induced vibration and rod bow.

Two methods for spacer S capture to water rod W are disclosed.

In a first and preferred embodiment, two conventional springs 220 and one spacer capture spring 230 bias the water rod against three stops 215. The conventional springs 220 are loop springs which loop around, and are held in place by plates 210. These plates are welded to ferrules F in the ferrule spacer. The stops 215 are integral with plates 210, which plates are welded to ferrules. The individual springs, stops and plates are similar to members used in prior art.

Figure 6A:
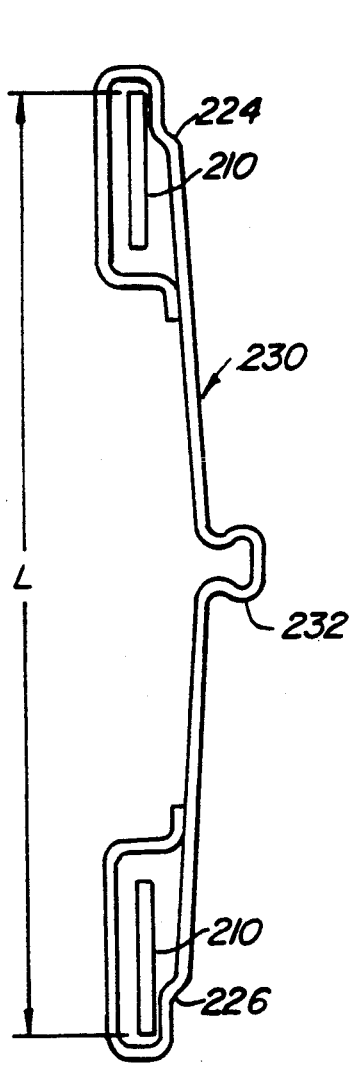
FIG. 6A is a side elevation of a spring suitable for use in the embodiment of FIG. 5.
Figure 6B:
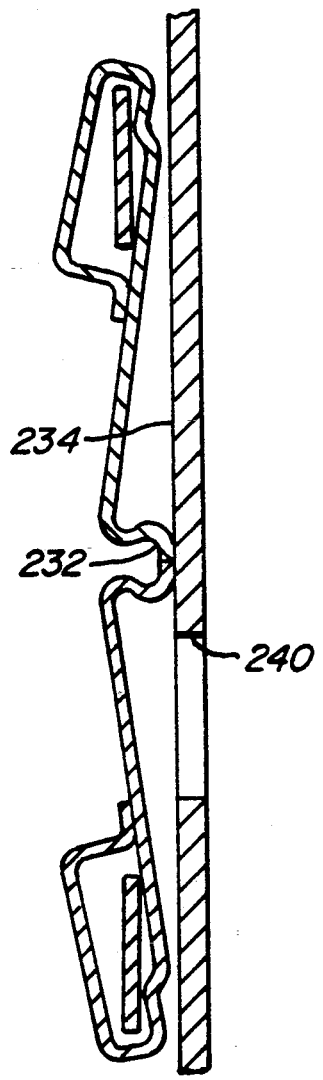
FIG. 6B is a side elevation of the spring in FIG. 6A, the view showing the spring sliding along the water rod prior to registry with an aperture in the side wall of the water rod.
Figure 6C:
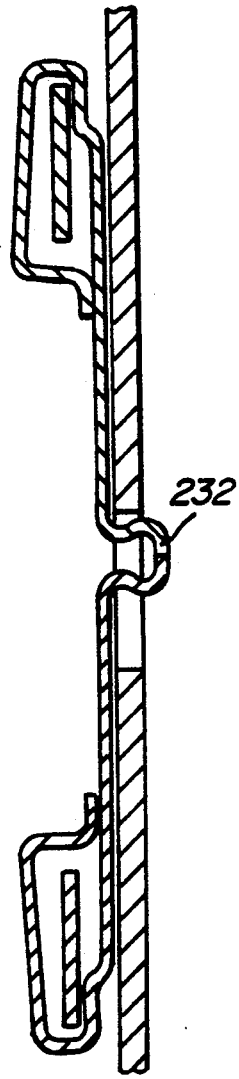
FIG. 6C is a side elevation similar to FIG. 6B illustrating the spring engaged with the water rod for locking the water rod to the spacer; and, FIG. 7 illustrates a spacer with a series of tabs for the locking of the spacers to the water rod.

Referring to FIGS. 6A, 6B and 6C, the construction of spring 230 can be understood.

Typically, the spring 230 attaches at an upper loop 224 about an upper tab 210. Similarly, the spring 230 attaches at a lower loop 226 about a lower tab 210. Springs used to bias the water rod against stops have a slight protrusion at midspan which bears against the water rod. In the locking spring 230 this protrusion 232 is enlarged. While the water rod is being inserted into the spacer the projection 232 rides on the water rod surface 234. When the water rod is in its final position relative to the spacer, the projection 232 fits into hole 240 configured in the side of the water rod W. When spring 230 at projection 232 penetrates aperture 240 in the side of the water rod W, it prevents axial movement of the spacer relative to the water rod W.

FIG. 6A, 6B and 6C show elevation views of a cross section through the spring 220. FIG. 6A shows the spring with no water rod present. FIG. 6B shows the spring deflected as the water rod is inserted, and FIG. 6C shows the spring in the locked position with the projection inserted into a hole 240 in the water rod P. The shape of the projection insures that the projection cannot come out of the hole when a vertical load is applied to the spacer.

Prior art springs have been complete loops. In the present application a greater deflection range is required. During insertion of the water rod the spring is deflected as shown in FIG. 6B. This deflection must be elastic, and the spring must exert a load in the final position, FIG. 6C. The shape shown acts approximately as a simply supported beam. It has a greater elastic deflection range than a loop spring of the same length.

The rectangular holes in the water rod are made slightly larger than the projection on the spring, so that there is clearance around the projection when inserted. This clearance is required to compensate for variations in the relative positions of the spring and the water rod hole. This clearance provides an additional flow path for coolant from outside the water rod (pressure inside the water rod is less than outside). However the area is small compared to the area of the orifice in the transition piece and is obstructed by the mating spring; the combination of these factors maintains the water environment interior of the water rod P and limits the water rod flow rate.

Figure 7:
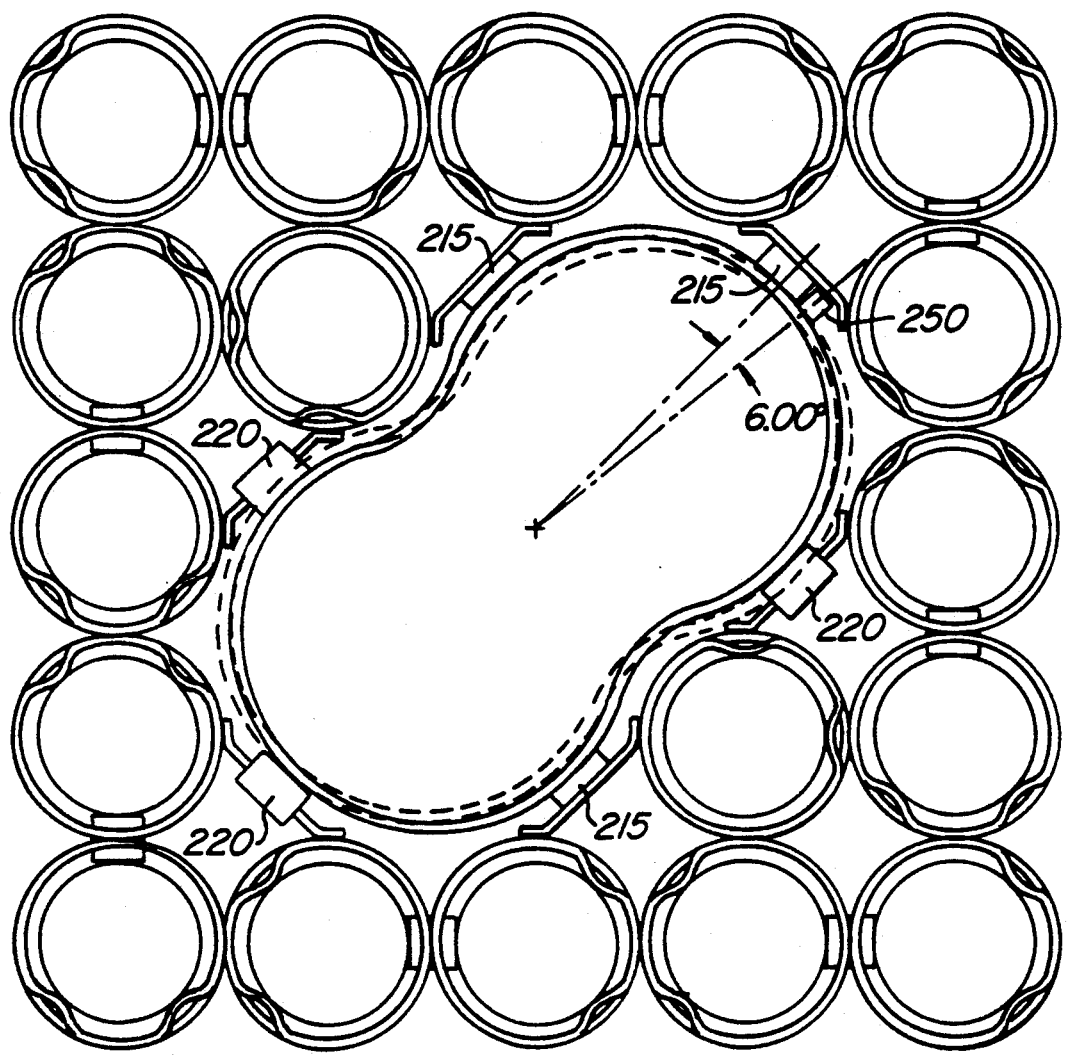

FIG. 7 illustrates an alternate embodiment of this invention. In the embodiment of FIG. 7 rotation of spacers relative to water rod by small angle is utilized to lock the spacers to the large water rod.

Utilizing the dimension illustrated in FIG. 7, it can be seen by the cross section through a "peanut" water rod W just above a spacer S that there is a small clearance between the exterior of the water rod P and the exterior of the spacer S. The water rod is configured with a small tab 250 on the exterior surface. The orientation of springs 220 and stops 215 allows rotation in one direction. Clockwise rotation of the water rod relative to the spacer S compresses the springs. Counter clockwise rotation is prevented by the stops 215. Tabs 250 similar to the ones in the prior art are welded to the water rod W. In the non rotated position, with the water rod pushed against the stops 215 by the springs 220, the water rod tabs 250 are just above and below a tab 215 on the spacer band. In this angular position the spacer is locked in position axially.

When the water rod W is rotated relative to the spacer S, as shown by the dashed lines, the water rod tabs 250 are no longer aligned with the spacer tab 215, and the spacer S can be moved along the water rod axis. The geometry of this rotation is such that the displacement of the water rod tab is about 2½ times the deflection imposed on the spring. This ratio is important because (1) there is little space available for spring compression, (2) the elastic deflection of a spring which fits into the available space is limited and (3) there must be a gap between the water rod tabs and the spacer tabs in the rotated position to allow for variations in the as built geometry.

To assemble a set of spacers on a water rod, the water rod is held fixed. The first spacer slides along the water rod until the first set of tabs is reached and is rotated to clear these tabs. It is moved along the water rod, being rotated at each set of tabs until it reaches its final position, and is locked in place. The rest of the spacers are assembled in the same way.

During reactor operation, the spring forces will relax somewhat under neutron irradiation. Then there is a small probability that the water rod could rotate relative to the spacers, and the water rod tabs would no longer be captured by the spacer stops. This situation can be prevented by changing the location of springs and stops, and the direction of rotation at one of the spacers.

Then the spacers are assembled to the water rod, one at a time. At each tab location on the water rod the spacer is rotated to pass this location. After the fuel bundle is completely assembled, with the channel in place, the channel prevents spacer rotation. Then the water rod rotation is positively prevented in one direction by some of the spacers, and rotation in the other direction is prevented by the other spacers.

What is claimed is:

1. In a nuclear fuel bundle having a non-circular water rod comprising:
   a plurality of vertical and upstanding fuel rods configured in a matrix of at least eight rows and eight columns;
   a lower tie plate for supporting said matrix of fuel rods and permitting the inflow of water moderator to said fuel bundle;
   an upper tie plate for maintaining the upper end of at least one of said matrix of fuel rods vertically upstanding, said upper tie plate configured for permitting the exit of water and steam moderator from said fuel bundle;
   a fuel channel, said channel open at the bottom for fitting around said lower tie plate, open at the top adjacent said upper tie plate, and surrounding said upstanding fuel rods therebetween for defining a flow path between said tie plates through said fuel rods;
   a plurality of fuel rod spacers at selected elevations within said fuel bundle and disposed between said tie plates, each said spacer defining discrete cells for surrounding each said fuel rod at said selected elevations whereby said fuel rods are braced in side-by-side relation at said spacers; and,
   a large water rod occupying a plurality of matrix positions in said fuel rod matrix;
   the improvement to said fuel bundle comprising:
   a large non circular water rod disposed centrally of said fuel bundle, said large non circular water rod having a dimension with respect to said fuel rods whereby said large non circular water rod occupies at least a non symmetrical plurality of matrix positions in said fuel rod matrix, said non circular water rod and said non symmetrical plurality of matrix positions in said fuel rod matrix inhibiting relative rotation of said non circular water with respect to said matrix of fuel rods;
   a spacer, said spacer including a matrix of spacer cells in a corresponding matrix to said fuel rods of at least eight rows and columns, said matrix defining a vacant interval therein having a size for accommodation of said large non circular water rod;
   means for locking said spacers to said water rod at preselected elevations on said water rod including first tab locking means on said water rod at said preselected elevations and second locking means on said spacers,
   said second locking means on said spacers being configured for sliding passage over said exterior of said non circular water rod in a first angular non locking disposition of said second locking means and cooperative engagement to said means for locking said spacer on said water rod in a second angular locking disposition of said second locking means whereby said spacer can be moved over the exterior of said large non circular water rod to one of said first locking means on said large non circular water rod and moved to said second locking disposition for locking to said large non circular water rod; and,
   stop means on said spacer for receiving said non circular water rod in said second angular disposition;
   spring means on said spacer for urging said non circular water rod from said first angular non locking position to said second angular locking position to permit said non circular water rod to be biased to said first angular non locking disposition with respect to said spacer for insertion through said spacer and to maintain said non circular water rod in said biased second angular locking position after insertion of said non circular water rod; and,
   means for locking said water rod to said lower tie plate for preventing relative vertical movement of said water rod relative to said lower tie plate.

2. The invention of claim 1 and wherein said second locking means on said spacer includes:
   stop means on one side of said vacant interval of said at least one spacer;
   spring means for biasing said water rod on the opposite of side of said vacant interval of said at least one spacer.

3. The invention of claim 1 and wherein said means for locking said large non circular water rod to said tie plate comprises:
   a support rod having a reduce diameter with respect to said large non circular water rod, said support rod having an upper end for supporting and receiving said large non circular water rod and a lower end for connection to said tie plate;
   means for fastening said support rod at said lower end to said lower tie plate for preventing vertical motion of said water rod relative to said lower tie plate.

4. The invention of claim 3 and wherein said support rod defining a conduit for permitting water from said tie plate to be communicated to the interior of said water rod.

5. The invention of claim 3 and wherein said support rod includes a transition piece between said water rod and said support rod and said transition piece defines a conduit from the interior of the lower portion of said fuel bundle to the interior of said large non circular water rod.

6. In a nuclear fuel bundle having a non-circular water rod including:
   a plurality of vertical and upstanding fuel rods configured in a matrix of at least eight rows and eight columns;
   a lower tie plate for supporting said matrix of fuel rods and permitting the inflow of water moderator to said fuel bundle;
   an upper tie plate for maintaining the upper end of at least some of said matrix of fuel rods vertically upstanding, said upper tie plate configured for permitting the exit of water and steam moderator from said fuel bundle;

a fuel channel, said channel open at the bottom for fitting around said lower tie plate, open at the top adjacent said upper tie plate, and surrounding said upstanding fuel rods therebetween for defining a flow path between said tie plates through said fuel rods;

a plurality of fuel rod spacers at selected elevations within said fuel bundle and disposed between said tie plates, each said spacer defining discrete cells for surrounding each said fuel rod at said selected elevations whereby said fuel rods are braced in side-by-side relation at said spacers; and, a large non circular water rod disposed centrally of said fuel bundle, said large non circular water rod having a dimension with respect to said fuel rods whereby said large non circular water rod occupies at least a non symmetrical plurality of matrix positions in said fuel rod matrix, said non circular water rod and said non symmetrical plurality of matrix positions in said fuel rod matrix inhibiting relative rotation of said non circular water with respect to said matrix of fuel rods;

a spacer, said spacer including a matrix of spacer cells in a corresponding matrix to said fuel rods of at least eight rows and columns, said matrix defining a vacant interval therein having a size for accommodation of said large non circular water rod; the improvement to said non circular water rod and spacer comprising:

aperture means for locking said spacers to said water rod at preselected elevations on said water rod;

locking means on said spacers including springs being attached to said spacer, said spring including a water rod abutting member configured for sliding passage over said exterior of said non circular water rod in a first non locking disposition of said locking means on said spacer and cooperative engagement to said aperture locking means on said non circular water rod in a second locking disposition of said spring whereby said spacer can be moved over the exterior of said large non circular water rod to one of said aperture locking means on said large non circular water rod and moved to said second locking disposition for locking to said large non circular water rod; and, means for locking said water rod to said lower tie plate for preventing relative vertical movement of said water rod relative to said lower tie plate.

7. The invention of claim 6 and wherein said second locking means on said spacer includes:
stop means on one side of said vacant interval of said at least on spacer;
spring means for biasing said water rod on the opposite of side of said vacant interval of said at least one spacer.

8. The invention of claim 6 and wherein said means for locking said large non circular water rod to said tie plate comprises:
a support rod having a reduce diameter with respect to said large non circular water rod, said support rod having an upper end for supporting and receiving said large non circular water rod and a lower end for connection to said tie plate;
means for fastening said support rod at said lower end to said lower tie plate for preventing vertical motion of said water rod relative to said lower tie plate.

9. The invention of claim 8 and wherein said support rod defining a conduit for permitting water from said tie plate to be communicated to the interior of said water rod.

10. The invention of claim 8 and wherein said support rod includes a transition piece between said water rod and said support rod and said transition piece defines a conduit from the interior of the lower portion of said fuel bundle to the interior of said large non circular water rod.

* * * * *